Dec. 10, 1968     R. Q. SKRMETTA ETAL     3,414,934
SHRIMP VEIN REMOVING APPARATUS
Filed June 29, 1966     3 Sheets-Sheet 1

Raphael Q. Skrmetta
Cecil B. Skrmetta
INVENTORS

Dec. 10, 1968 R. Q. SKRMETTA ET AL 3,414,934
SHRIMP VEIN REMOVING APPARATUS
Filed June 29, 1966 3 Sheets-Sheet 2
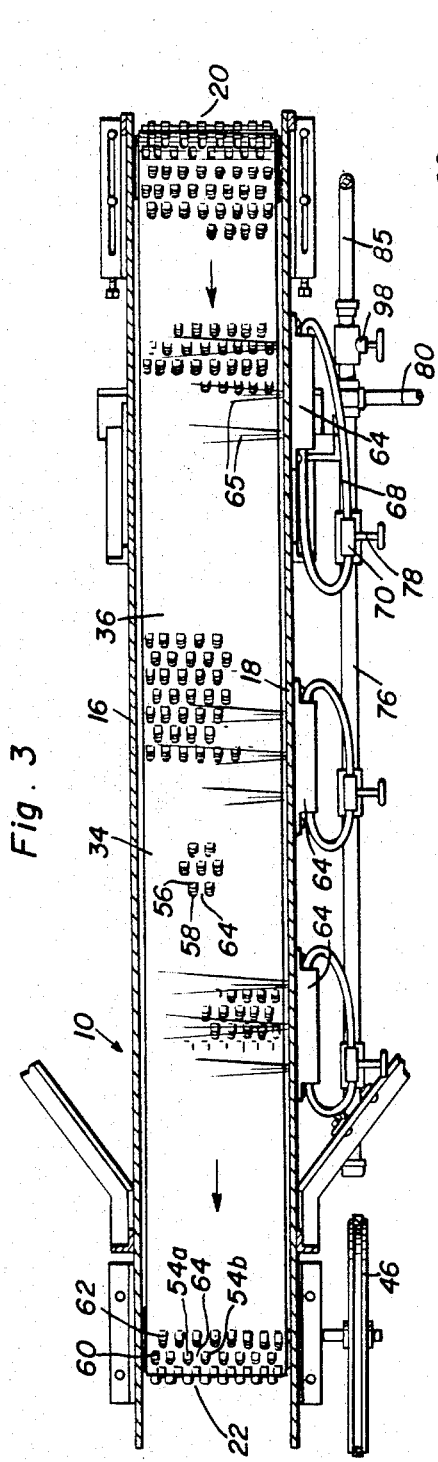
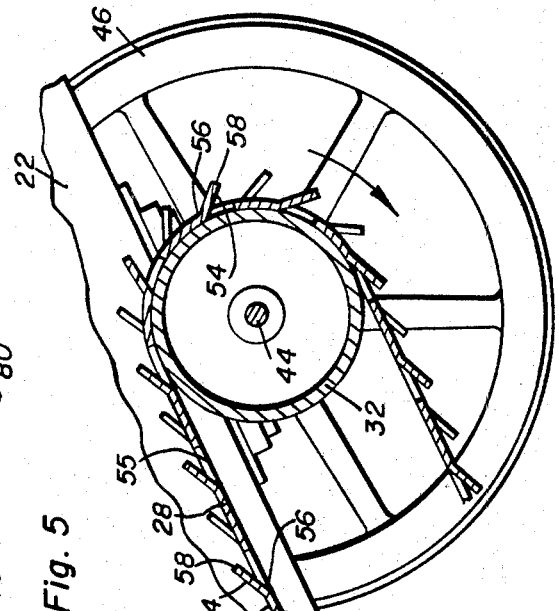
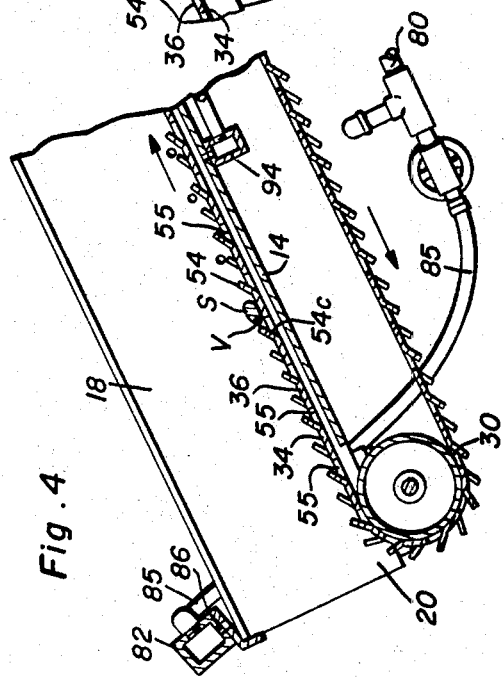
Raphael Q. Skrmetta
Cecil B. Skrmetta
INVENTORS
BY *Clarence A. O'Brien*
*and Harvey B. Jackson*
Attorneys Dec. 10, 1968   R. Q. SKRMETTA ET AL   3,414,934
SHRIMP VEIN REMOVING APPARATUS Filed June 29, 1966                              3 Sheets-Sheet 3

Raphael Q. Skrmetta
Cecil B. Skrmetta
INVENTORS

BY Clarence A. O'Brien
and Harvey B. Jacobson
Attorneys

United States Patent Office 3,414,934
Patented Dec. 10, 1968

3,414,934
SHRIMP VEIN REMOVING APPARATUS
Raphael Q. Skrmetta and Cecil B. Skrmetta, both of
P.O. Box 13145, New Orleans, La. 70125
Filed June 29, 1966, Ser. No. 561,534
7 Claims. (Cl. 17—2)

ABSTRACT OF THE DISCLOSURE

A shrimp vein removing apparatus and conveyor incorporating a conveyor belt provided with forwardly inclined fingers thereon for engaging and removing shrimp veins which may be left attached to the shrimp after passing through a shrimp slitting apparatus to provide shrimp in a final condition substantially free of any attached vein.

---

This invention generally appertains to improvements in apparatus for the removal of sand veins from shrimp and the cleaning of the shrimp and, more particularly, relates to novel improvements in shrimp vein removing apparatus, which are utilized to remove any unremoved veins from previously cut and deveined shrimp.

It has been found that the shrimp deveining machine, constructed and utilized in accordance with our prior Patent No. 3,031,714, issued May 1, 1962, performs an excellent job of cutting the backs of shrimp and that the sand veins are almost completely removed from the cut shrimp by utilizing a washing apparatus, constructed in accordance with our prior Patent No. 3,024,490, issued Mar. 13, 1962.

Though it has been noted that a very high percentage of the shrimp are in completely deveined and washed condition, after being subjected to treatment by deveining and cleaning apparatuses, constructed in accordance with the foregoing patents, it has also been found that a substantial percentage of the shrimp, after being fully cut and subjected to a washing action, have their sand veins hanging therefrom with the veins not being broken completely loose from the shrimp. Obviously, this results in the final packaging of the shrimp in a condition wherein the vast percentage of the shrimp have the veins completely removed therefrom but with a good percentage of the shrimp having the veins hanging onto the shrimp.

Accordingly, a primary object of the present invention is to provide an apparatus which will simultaneously treat a number of shrimp and which will act on the shrimp so as to loosen veins hanging from the shrimp and remove loose veins from the shrimp, resulting in the obtaining of any particular shrimp output, wherein each and every one of the shrimp is completely cleaned.

Another object of the present invention is to provide a shrimp vein removing apparatus which will not damage the shrimp, particularly so that there will be less damage to the color pigments of deveined shrimp, resulting in greater economic yields.

Another important object of the present invention is to provide a shrimp vein removing apparatus, which is more economical to use and costs considerably less to manufacture and maintain in operation, when considered on a per pound basis that the consumer has to pay for the product, and which will be used, in conjunction with the shrimp deveining machine and washing apparatus of our foregoing patents to carry out a final step in the complete and fully cleaning of the shrimp, with each shrimp of the total number treated being in a clean final condition and having an undamaged and very attractive and appetizing appearance.

Another object of the present invention is to provide a shrimp vein removing device which is constructed and adapted for use as a functional and structural adjunct to the shrimp washer and peeler apparatus of our prior Patent No. 3,024,490 so as to act on the shrimp in successive structural and functional relationship with such apparatus or in successive functional follow-up relation only therewith to achieve the ultimate aim and purpose that the shrimp are given a final treatment so as to be in perfectly finished cleaned condition with a very attractive appearance.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a longitudinal, cross-sectional view, taken substantially on line 3—3 of FIGURE 1;

FIGURE 4 is a longitudinal, vertical, detailed sectional view taken substantially on line 4—4 of FIGURE 2;

FIGURE 5 is an enlarged, sectional view of the upper end of the apparatus, showing the endless conveyor traveling around a drive roller;

Figure 2:
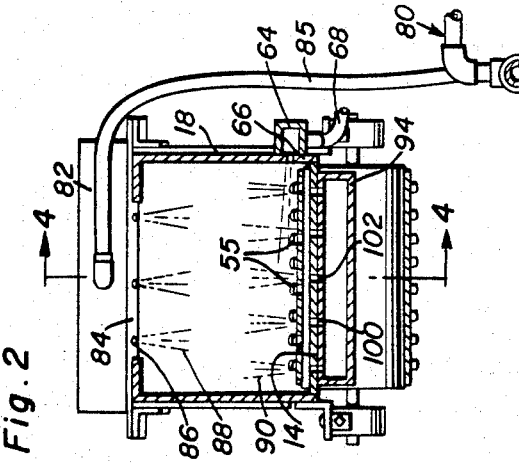
FIGURE 2 is a vertical, cross-sectional view, taken substantially on line 2—2 of FIGURE 1.

Referring now more particularly to the accompanying drawings and initially to FIGURES 1–5, the shrimp vein removing apparatus, which is intended for use in removing loose shrimp veins from shrimp previously deveined on a deveining machine, such as that disclosed in Patent No. 3,031,714, and washed and peeled in a shrimp washer and peeler device, such as that disclosed in Patent No. 3,024,490, is generally designated by the reference numeral 10.

Figure 1:
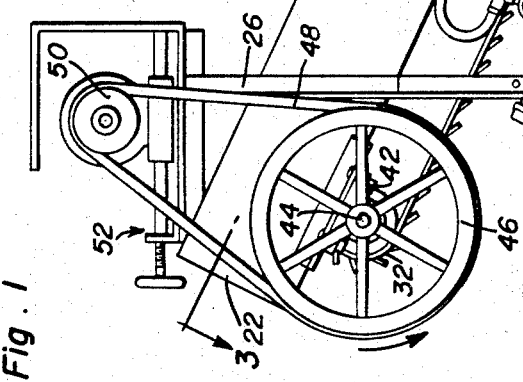
FIGURE 1 is a side elevational view of a shrimp vein removing apparatus, constructed in accordance with the present invention.

The apparatus 10 includes a trough 12, which is composed of a flat bottom wall 14 and opposing straight side walls 16 and 18. The trough 12 is positioned in an inclined plane, so that it has a lower loading end 20 and an upper discharge end 22. The trough is supported, in such inclined position as shown in FIGURE 1, by means of a set of lower standards 24, disposed on opposite sides of the trough and suitably connected to the outsides of the side walls 16 and 18 of the trough. An upper set of standards 26 is provided, with the standards 26 of greater height than the lower standards 24 and being disposed on and attached to the opposite sides of the trough. The standards 26 may be formed in sections so that they can be adjusted, whereby the angle of inclination of the trough 12, relative to the floor surface, may be adjusted, if desired.

An endless belt 28 is provided and is supported, at its lower end, by an idler roller 30 and supported, at its upper end, by a drive roller 32, in a manner so that the belt has an upper flight or reach 34 which passes over the bottom 14 of the trough 12. The upper flight or reach 34 has a flat upper face 36.

The endless belt 28, which is preferably formed from thin stainless steel, travels around the rollers 30 and 32 and is driven by the drive roller 32 in such a manner so that the upper flight or reach 34 moves upwardly in the trough, in the direction of the arrows, as shown in FIGURES 3 and 4.

The idler roller 30 is mounted in suitable bearing bracket supports 38 that are attached to the opposite sides 16 and 18 of the trough, at the lower end 20 thereof. The roller is provided with a belt adjustment or tightening means 40.

The drive roller 32, which rotates in a counter-clockwise direction, as viewed in FIGURE 1, is supported by bracket bearing supports 42, that are attached to the sides 16 and 18 of the trough, adjacent the upper discharge or outlet end 22 of the trough. The roller 32 includes a shaft 44, which has a projecting end on which a drive pulley 46 is fixed. The drive pulley 46 is connected by a belt 48 to a motor driven drive pulley 50, which is operatively connected to any suitable prime mover. A belt tightening means 52 is structurally associated with the pulley 50 so as to adjust the belt 48. With the pulley 46 rotated in a counter-clockwise direction, it can be seen that the roller 32 will rotate in a counter-clockwise direction, as viewed in FIGURE 1, so that the upper reach 34 of the belt will move upwardly therearound.

The belt 28 is provided with a plurality of spring fingers 54 in the form of fingernail like members, the fingers being preferably formed by punching portions of the belt outwardly. As shown in FIGURES 4 and 5, the fingers are formed so that each finger includes an inner attached portion 56 and an upstanding, free rounded end portion 58, which lies upwardly out of the plane of the reach 34, so that the rounded free ends 58 of the fingers lie in a common plane that is disposed above the plane of the upper or top surface 36 of the upper reach 34, as the belt moves upwardly in the trough.

Preferably, the fingers are formed by being punched out from the belt so as to create perforations or openings 55 in the belt, such perforations or openings being established by virtue of the voids left in the belt when the fingers are punched out. In the event that the fingers are formed as separate entities so that they would be fixed, as by spot welding or the like on the belt, then the belt would be of a perforated nature.

As shown more particularly in FIGURE 3, the fingers are formed in longitudinally spaced, transverse rows 60 and 62, which are representative, in that the fingers of the rows are staggered so that the fingers of row 60 have their free outer ends 58 pointing toward the belt portions 64 interposed between adjoining fingers 54a and 54b of a preceding row, considered in the upward directional movement of the upper reach 34 over the bottom 14 of the trough.

In other words, as can be appreciated from a consideration of FIGURE 3, the fingers are arranged in transverse rows which are spaced slightly apart in the longitudinal direction of the upper reach 34, with the fingers of successive rows being arranged in staggered relationship.

The rounded tips or free ends 58 of the spring fingers, which lie in a plane above the plane of the upper surface 36 of the upper reach 34, are adapted to engage the hanging veins on non-completely deveined shrimp and capture or hook the veins so as to completely remove the veins from the shrimp. The shrimp are deposited in the trough at the lower end 20 and are adapted to be carried upwardly toward the upper discharge end 22, while being acted upon by the fingers, with the tips 58 capturing the hanging veins and separating the hanging veins from the shrimp.

It is to be noted that the fingers extend or point in the direction of upward travel of the upper flight or reach 34 and that the shrimp are deposited in the trough and caught by the tips of the fingers so that a complete cleaning action results.

Means is provided for causing the shrimp to be lifted from the upper surface 36 of the upper flight or reach 34 of the belt and to cause the shrimp to tumble over the fingers, for more severe action when required in the event that some of the shrimp have veins so attached thereto that it is very difficult for the fingers to remove the hanging veins from the shrimp. The means for creating a tumbling and rolling action of the shrimp preferably comprises jet blasts 65 of fluid directed across the upper reach 34, transversely of the path of movement of the upper reach, and in a manner to impinge, sideways or laterally, upon the upstanding fingers. Such jet blasts will not only produce a turbulent, rolling action of the shrimp but will prevent an unveined shrimp from being captivated by any one of the fingers and held in such position for the full travel movement of the upper reach in the trough.

The jet blasts 65 of fluid are in the form of liquid blasts, preferably water jets. In this respect, a plurality of manifolds 64 are attached to one of the side walls of the trough, as for example the side wall 18, as shown in FIGURES 1 and 3. The manifolds 64 are secured to the side wall in spaced relation, along the longitudinal extent of the side wall and the longitudinal extent of the trough. The side wall 18, as shown in FIGURE 2, is formed with a plurality of longitudinally spaced, small jet openings 66, which communicate the manifolds with the interior of the trough and provide the means, whereby fluid in the manifold is forced under pressure across the upper surface of the upper reach and into contact with the fingers, as shown in FIGURE 2.

Each of the manifolds is provided with inlet lines 68, which are connected to T-couplings 70 that, in turn, are connected by pipes 72 to T-couplings 74, which are connected in line with a common conduit 76. Hand valves 78 are provided in the conduits 72 to control the admission of fluid to each of the manifolds 64, in individual manner. The fluid, such as water, is conveyed from a fluid pressure source, such as a pump (not shown) through a conduit means 80 to the common distributing conduit 76.

When the shrimp are engaged by fingers at the lower inlet end 20 of the trough, some of the shrimp, though they have just been removed from a washing apparatus, such as of the type shown in our prior patent, may have not been thoroughly washed and cleaned, so that they would have unwanted debris or shell appendages clinging thereto. In order to rid such shrimp of such clinging appendages, a header 82 is disposed transversely over the lower end 20 of the trough and receives the fluid under pressure from the conduit 76 by means of a flexible tubing 85. The header has an underside 84 which is formed with jet openings 86 through which the water passes in downwardly directed jet sprays 88, as shown in FIGURE 2, so as to cover the entire transverse extent of the upper surface 36 of the upper reach or flight of the belt and impinge on the shrimp and clean the shrimp thoroughly.

The downward jet sprays 88 further and most importantly function to forcibly pass down through the perforations or openings 55 to draw the exposed veins, which are hanging losely from the shrimp, into the pinching spring fingers so as to be caught thereby and removed from the shrimp.

Jet streams or blasts 90 are directed upwardly, from underneath the upper flight or reach 34 of the endless belt and are arranged so that they are in staggered arrangement with the downward blasts 88. Such upward blasts pass through the perforations 55 to act in consort with the downward jet sprays 88 in drawing the hanging exposed veins into position for picking or plucking by the resilient gripping action of the fingers 54.

In addition, the upward jet blasts 90 serve to clean the fingers, as they come around the roller 30 and start on their upward movement and receive the shrimp deposited at the inlet end of the trough. The fingers may possibly have veins adhering thereto and the upward blasts 90, which pass through the openings 55 formed in the belt by virtue of the punched out fingers 54 (or formed deliberately in the belt in the instance where the fingers are separate components affixed on the belt), impinge upon the underside of the fingers and the outer tips 58 thereof.

The jet blasts 90 are obtained by means of a lower manifold 94, which is transversely disposed below the bottom 14 of the trough and which receives the water under pressure by means of a flexible conduit 96. The flow of fluid in the conduits 85 and 96 is controlled by a hand valve 98. The bottom of the trough is formed with jet openings 100, which communicate with jet openings 102 in the attached wall of the transversely orientated manifold 94.

In use, the shrimp, after being treated by a deveining apparatus and washing apparatus of the types disclosed in our prior patents, are deposited in bulk on the lower end 20 of the trough and the endless belt is driven by the drive roller 32 through the drive belt means, as shown in FIGURE 1, or by any other suitable drive means. The shrimp are initially contacted by the downwardly directed jet blasts 88 and the upward fluid jet blasts 90 which serve to clean the shrimp and to draw the exposed veins into the clutching pinching fingers and also function to clean the fingers. The fingers, in view of their staggered row arrangement, as shown in FIGURE 3, carry the shrimp upwardly on the upper reach 34 of the belt and the hanging veins of the shrimp are contacted by the tips 58 of the spring fingers. Thus, as shown in FIGURE 4, a shrimp S has its hanging vein V engaged by the tip of the finger 54c and the finger serves to engage the hanging vein and remove the vein from the shrimp.

The shrimp are prevented from being captivated by the fingers and are subjected to a turbulent, rolling action by the transverse jet blasts from the manifolds 64, as shown in FIGURES 2 and 3. Thus, the shrimp are kept in a constant state of tumbling agitation and are lifted from and bounced on the upper surface 36 of the upper reach or flight 34 of the endless belt.

The shrimp, after being constantly and repeatedly subjected to the action of the spring fingers are carried ultimately by the spring fingers to the upper discharge end 22 of the trough and are deposited into any suitable receptacle or conveying means for ultimate packaging, in any manner, to be delivered to the customers.

As the fingers pass around the top roller 32, which is shown in FIGURE 5, the fingers tend to flex outwardly slightly, away from the outer surface of the belt, due to the curvature of the end of the belt in its entrainment over the drive roller 32. Such slight outward flexing of the fingers ensures that any caught veins will be released by the fingers and drop free therefrom. In the event that some of the fingers still have veins clinging thereto, when they enter the lower end of the trough, the jet blasts 90 will ensure that the veins are removed and that all of the fingers are in a clean condition to receive subsequent bulk loads of shrimp deposited on the upper flight or reach of the belt, at the lower end of the trough.

Figure 6:
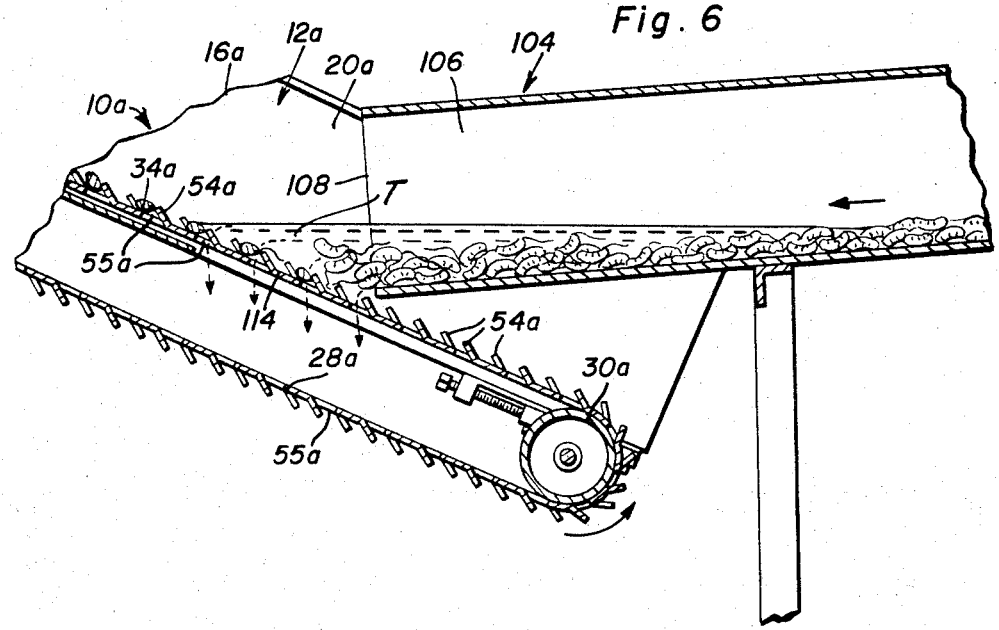
FIGURE 6 is a fragmentary longitudinal sectional view, on an enlarged scale, showing the vein removing apparatus of FIGURE 1 in structural association with a washer and peeler apparatus, formed in accordance with Patent No. 3,024,490, and, FIGURE 7 is a side elevational view of the assembly of FIGURE 6.
Figure 7:
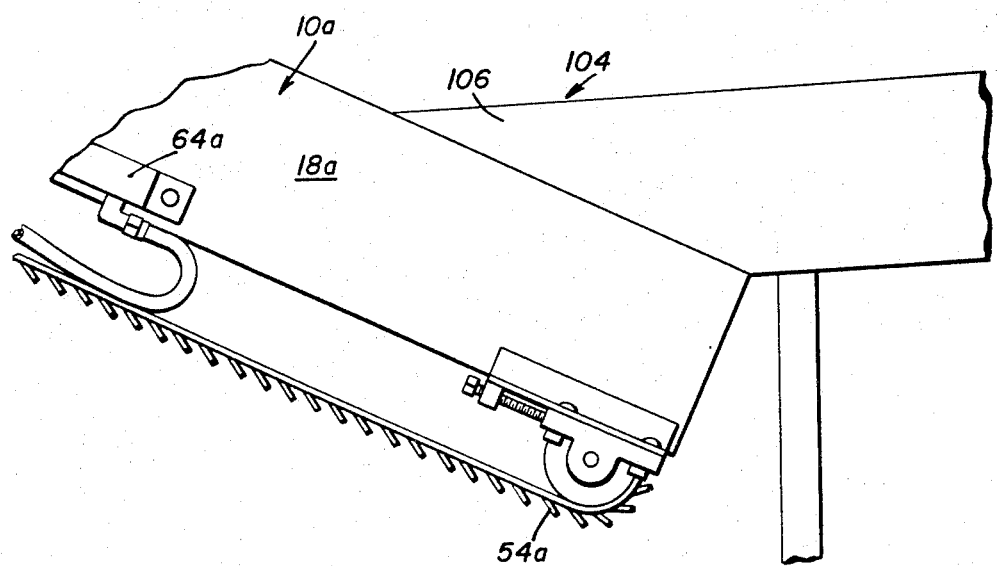

As shown in FIGURES 6 and 7, the shrimp vein removing apparatus 10a, which is the structural and functional equivalent of the apparatus 10, shown in FIGURES 1 through 5, is illustrated in structural association with a shrimp washer and peeler, which is constructed in accordance with Patent No. 3,024,490.

The shrimp washer and peeler 104 is constructed substantially in accordance with FIGURE 2 of such patent and, generally stated, comprises a trough or flume in the form of channel-like structure 106, which is inclined and has a discharge lower end 108 from which water, as indicated by the arrows in FIGURE 6, and shrimp, as illustrated in FIGURE 6, emerge. The water rushes outwardly from the discharge end 108 and the shrimp exit from the discharge end with the water. The primary function of trough 106 is to take fully peeled shrimp that have been previously cut and by water jets open up the shrimp at the cut and wash the veins out of the shrimp for the apparatus 10a to remove the hang-on veins.

With respect to the use of the apparatus 10 of FIGURES 1–5, shrimp, as they emerge from the outlet 108, are collected and then are deposited on the upper elevating flight of the endless belt at the lower loading end 20. However, in the form of FIGURES 6 and 7, the shrimp vein removing device 10a is not only a functional adjunct to the washer and peeler apparatus 104 but is also a structural adjunct in that it is structurally correlated with the outlet or discharge end 108.

Thus, the discharge end 108 of the trough 106 overlies the lower loading end 20a and is positioned within the trough above the lower end portion of the upper flight 34a so that the rushing water, indicated by the arrows in FIGURE 6 and the shrimp (illustrated in FIGURE 6) fall onto the lower end portion of the upper flight 34a.

The lower loading end 20a of the trough 12a and the lower end portion 114 of the upper flight or reach 34a underlie the discharge or outlet end 108 of the washing trough 106, as shown in FIGURE 6, so that the rushing water, cascading or exiting from the discharge end or outlet 108, passes down through the perforations or openings 55a in the belt. The water, as indicated by the arrows, is discharged in the nature of waterfall sprays and the water rushes downwardly through the perforations 55a for the purpose of drawing the exposed veins on the shrimp into the fingers 54a. Thus, from the trough discharge end 108 of the washing apparatus 104, the water rushes downwardly through the perforations 55a of the belt so as to serve the same purpose as the downwardly directed jet sprays 88, shown in FIGURE 2.

The discharge end 108 of the trough 106 is positioned within the lower loading end 20a of the trough 12a and disposed between the side walls 16a and 18a with the discharge end 108 positioned approximately six inches, for example, ahead of the center of the shaft for the lower idler roller 30a.

The shrimp and rushing water will fall onto the lower end portion 114 of the upper flight or reach 34a and there is an abundance of water, simulating a tank within the lower loading end 20a of the trough 12a, as generally identified by the reference character T in FIGURE 6, with the water rushing down through the perforations 55a in the belt 28a. The water builds up somewhat to define a simulated water-filled tank T and functions to draw the exposed veins from the shrimp deposited from the discharge end 108 of the washing trough 106 and clustered on the lower end portion 114 of the upper flight 34a into the fingers 54a.

The shrimp are in a simulated whirl until they gain traction with the upper flight 34a of the belt 28a, presenting the exposed veins for picking by the fingers 54a.

After the shrimp gain traction with the upper flight 34a, they are carried by the upper flight and the fingers 54a up to the outlet end (not shown but the same as the outlet end 22 of the apparatus 10).

Above the point where the outlet end 108 of the washing trough 114 is in meeting discharge adjacency with the upper flight 34a, the side wall 18a of the device 10a is provided with a manifold 64a, which is supplied with liquid under pressure in the same manner as the manifolds 64 of FIGURES 1 through 3. The manifold 64a is provided so that the shrimp on the upper surface of the elevating or upper flight, after they have been deposited onto the lower end portion 114 of the upper working flight 34a, are subjected to jet blasts of fluid passing transversely over the upper surface of the flight and impinging on the fingers 54a and contacting the shrimp lying on the upper surface of the upwardly moving working flight of the endless belt so that the shrimp are given a tumbling action and are indiscriminately lifted bodily from the surface and are tumbled over and over into contact with the ends of the fingers to ensure that all of the hanging veins of the shrimp are pinched and removed from all of the shrimp by the plucking or pinching action of the fingers 55a.

The foregoing is considered as illustrative only of the principles of the invention. Further, since numerous modifications and changes will readily occur to those skilled in the art, it is not desired to limit the invention to the exact constructions and operations shown and described, and accordingly all suitable modifications and equivalents may be resorted to, falling within the scope of the invention as claimed.

What is claimed as new is as follows:

1. Shrimp vein removing apparatus comprising an inclined trough having a lower loading end and an upper discharge end, an endless driven belt having a flight moving upwardly in the trough from the lower loading end to the upper discharge end, said flight having an upper surface, a plurality of fingers carried by the belt and projecting therefrom with the fingers having free ends disposed above the upper surface of said belt flight and facing in the direction of movement of the flight to pinch and remove veins hanging from shrimp engaged by the flight at the lower loading end with the shrimp moving over the upper surface and to move the shrimp in the trough to the discharge end, said belt being formed with perforations associated with the fingers, and means provided adjacent the lower loading end for exposing the hanging veins and presenting the exposed veins for picking by the fingers, said last means including means overlying the upper surface of the belt flight adjacent the lower loading end for directing fluid in downwardly forced jet blasts onto shrimp clustered on the belt flight adjacent the lower loading end with the blasts passing on down through the perforations in the belt.

2. The invention of claim 1 and including means for providing a tumbling action of the shrimp lying on the upper surface of the belt flight whereby the shrimp are moved into and out of contact with the fingers as they are moved by the fingers to the discharge end of the trough to insure that all of the hanging veins of all of the shrimp are removed.

3. The invention of claim 2, wherein said last means comprises jet blasts of fluid passing transversely over the upper surface of the flight and impinging on the fingers and contacting the shrimp lying on the upper surface and engaged by the ends of the fingers so that the shrimp are indiscriminately lifted bodily from the surface and are tumbled over and over into contact with the ends of the fingers so that all of the hanging veins of the shrimp are pinched and removed from all of the shrimp.

4. The invention of claim 1, wherein said belt is an endless stainless steel band with the fingers punched out of the steel band, said fingers being arranged in staggered rows across the band and terminating in rounded free ends in a common plane outwardly of the plane of the band.

5. The invention of claim 1, wherein said last means also includes means for directing fluid under pressure in jet blasts upwardly through the perforations, said upwardly directed jet blasts also functioning to clean the fingers.

6. The invention of claim 5, wherein the downwardly forced jet blasts of fluid and upwardly directed jet blasts of fluid are in staggered arrangement considered transversely of the trough.

7. Apparatus for conveying and deveining shrimp which in combination comprises: an endless flexible metallic belt having fingernail like members extending upwardly at an acute angle from the upper surface of the belt, and a flume for depositing water and previously slit shrimp with their sand veins exposed on the belt at a velocity substantially less than that of the belt, said shrimp momentarily being tumbled upon initial contact with the belt and the veins being engaged by the fingernail like members during such tumbling and the shrimp then gaining traction with the belt and assuming the speed of the belt prior to discharge therefrom.

References Cited

UNITED STATES PATENTS

| 2,825,927 | 3/1958 | Lapeyre et al. | 17—2 |
| 3,024,490 | 3/1962 | Skrmetta | 17—2 |

FOREIGN PATENTS

| 58,120 | 6/1937 | Norway. | |

LUCIE H. LAUDENSLAGER, Primary Examiner.

U.S. Cl. X.R.

17—45